United States Patent
Marks et al.

(10) Patent No.: US 7,938,325 B2
(45) Date of Patent: May 10, 2011

(54) INBOUND RECEIVING SYSTEM

(75) Inventors: Peter R. Marks, San Anselmo, CA (US); Ryan T. Emery, El Cerrito, CA (US); Duane O'Brien, Oakland, CA (US); River C. Lune, Berkeley, CA (US); Roger J. Gibby, Concord, CA (US)

(73) Assignee: Lynch Marks LLC, Albany, CA (US)

( * ) Notice: Subject to any disclaimer, the term of this patent is extended or adjusted under 35 U.S.C. 154(b) by 187 days.

(21) Appl. No.: 12/290,375

(22) Filed: Oct. 29, 2008

(65) Prior Publication Data

US 2009/0057403 A1 Mar. 5, 2009

Related U.S. Application Data (63) Continuation-in-part of application No. 12/009,126, filed on Jan. 15, 2008, and a continuation-in-part of application No. 12/122,658, filed on May 16, 2008.

(60) Provisional application No. 60/928,516, filed on May 16, 2007.

(51) Int. Cl.
*G06F 17/60* (2006.01)
(52) U.S. Cl. ........ 235/385; 235/380; 235/487; 235/439; 705/7; 705/26; 705/28
(58) Field of Classification Search .................. 235/385, 235/380, 487, 439; 705/7, 26, 28
See application file for complete search history.

(56) References Cited

U.S. PATENT DOCUMENTS

| | | | |
|---|---|---|---|
| 739,201 | A | 9/1903 | Morton |
| 4,319,328 | A | 3/1982 | Eggert |
| 4,832,204 | A | 5/1989 | Handy et al. |
| 5,477,462 | A | 12/1995 | McClung |
| 5,717,596 | A | 2/1998 | Bernard et al. |
| 5,787,400 | A | 7/1998 | Weber |
| 6,119,051 | A | 9/2000 | Anderson, Jr. et al. |
| 6,298,337 | B1 | 10/2001 | Kubatzki |
| 6,427,032 | B1 | 7/2002 | Irons |
| 7,082,417 | B1 | 7/2006 | Marry et al. |

(Continued)

FOREIGN PATENT DOCUMENTS

GB 2428315 A 1/2007

OTHER PUBLICATIONS

Online Publication, www.eshipper.com/aboutus.aspx, Publication Date: Nov. 18, 2006.

(Continued)

*Primary Examiner* — Allyson N Trail
(74) *Attorney, Agent, or Firm* — Carr & Ferrell LLP (57) ABSTRACT

Systems and methods of the present invention for receiving inbound shipments are provided. Bar code information may be decoded, and various types of information can be identified from the decoded bar code information. Such information may include, for example, recipient name, recipient address, a sender account number with the shipping vendor, etc. A database is searched based on such identified information. The database may further include other information associated with the identified information. A report including such information may be generated concerning the shipment. Such report may be stored and retrieved for reference when a future shipment with similar information is received.

20 Claims, 4 Drawing Sheets

U.S. PATENT DOCUMENTS

| | | | |
|---|---|---|---|
| 7,149,726 B1 | 12/2006 | Lingle et al. | |
| 7,209,897 B2 | 4/2007 | Ghiloni | |
| 2002/0023057 A1 | 2/2002 | Goodwin et al. | |
| 2002/0032573 A1 | 3/2002 | Williams et al. | |
| 2003/0083890 A1 | 5/2003 | Duncan et al. | |
| 2003/0115612 A1 | 6/2003 | Mao | |
| 2004/0188522 A1 | 9/2004 | Ashaari | |
| 2004/0230543 A1 | 11/2004 | Baker | |
| 2004/0243501 A1 | 12/2004 | Duffey | |
| 2004/0243522 A1 | 12/2004 | Foth | |
| 2004/0263901 A1 | 12/2004 | Critelli et al. | |
| 2005/0171791 A1 | 8/2005 | Chimenti et al. | |
| 2005/0171919 A1 | 8/2005 | Baker et al. | |
| 2005/0237203 A1* | 10/2005 | Burman et al. | 340/572.8 |
| 2005/0237204 A1 | 10/2005 | Burman et al. | |
| 2005/0278263 A1 | 12/2005 | Hollander | |
| 2006/0020505 A1 | 1/2006 | Whitehouse | |
| 2006/0080266 A1 | 4/2006 | Kiani | |
| 2006/0089869 A1 | 4/2006 | Mundy | |
| 2006/0089897 A1 | 4/2006 | Maas | |
| 2006/0173797 A1 | 8/2006 | Sheehan | |
| 2006/0173798 A1 | 8/2006 | Charroppin | |
| 2006/0229895 A1 | 10/2006 | Kodger, Jr. | |
| 2006/0282271 A1 | 12/2006 | Ananda et al. | |
| 2006/0282277 A1 | 12/2006 | Ng | |
| 2007/0000990 A1 | 1/2007 | Baldassari et al. | |
| 2007/0022059 A1 | 1/2007 | Heiden | |
| 2007/0043651 A1 | 2/2007 | Xiao et al. | |
| 2007/0073551 A1* | 3/2007 | Williams et al. | 705/1 |
| 2007/0124084 A1* | 5/2007 | Torre-Bueno | 702/19 |
| 2007/0260561 A1 | 11/2007 | Martin | |
| 2008/0126218 A1* | 5/2008 | Alvarado et al. | 705/26 |
| 2008/0210749 A1 | 9/2008 | Skaaksrud | |
| 2008/0255863 A1 | 10/2008 | Mack et al. | |
| 2008/0283586 A1 | 11/2008 | Marks et al. | |
| 2008/0288368 A1 | 11/2008 | Marks et al. | |
| 2008/0288422 A1 | 11/2008 | Marks et al. | |
| 2008/0288463 A1 | 11/2008 | Marks et al. | |
| 2009/0076918 A1 | 3/2009 | Blanchet | |
| 2009/0094082 A1* | 4/2009 | Willoughby | 705/7 |
| 2010/0057596 A1 | 3/2010 | Sundel | |
| 2010/0223173 A1 | 9/2010 | Kadaba | |

OTHER PUBLICATIONS

Online article, www.pr.com, "Shipping Sidekick . . . ", Publication Date: Aug. 31, 2007.

PS Ship Label Server, Published by Lynch Marks LLC as noted by web.archive.org on Feb. 13, 2006 of website http://web.archive.org/web/20060213043422/psship.com/pdf/psship_ups.pdf.

* cited by examiner

INBOUND RECEIVING SYSTEM

CROSS-REFERENCE TO RELATED APPLICATIONS

The present application is a continuation-in-part and claims the priority benefit of U.S. patent application Ser. No. 12/009,126 filed Jan. 15, 2008 and U.S. patent application Ser. No. 12/122,658 filed May 16, 2008, both of which claims the priority benefit of U.S. provisional patent application No. 60/928,516, filed May 16, 2007, the disclosures of such aforementioned applications are incorporated herein by reference.

The present application is also related to U.S. patent application Ser. No. 12/009,014 filed Jan. 15, 2008 and U.S. patent application Ser. No. 12/009,033, filed Jan. 15, 2008.

BACKGROUND OF THE INVENTION

1. Field of the Invention

The present invention relates to shipment management. More specifically, the present invention relates to using inbound receiving system.

2. Description of Related Art

There are presently a variety of ways to ship an item. The shipping vendors available to a user may include various well-known national and international vendors, such as FedEx®, United Parcel Service (UPS®), United States Postal Service (USPS®), and DHL®, as well as various local couriers. The availability of shipping services by shipping vendors may vary from location to location. For example, a local courier may only provide service within a particular city.

A shipment may also be sent using a variety of shipping options, including date and time restrictions, packaging options, recipient acknowledgement, and the like. For example, a package may need to be delivered in a padded envelope by a certain date and acknowledged by recipient signature. The availability of various shipping options may also differ from vendor to vendor. For example, a particular vendor may not offer overnight shipping, some vendors require overnight shipments to be ready for pick-up by a certain time, some vendors may have size and weight restrictions on overnight shipments, etc. In addition to size and weight restrictions, various other package specifications (e.g., shape, contents of package, value of contents) may also limit the availability of shipping options.

A shipment is typically associated with a variety of information from a variety of sources. Such information may include shipping label information, invoice information, etc., associated with multiple shipping vendors or intra-office shipments. Presently, accounting processes, such as record-keeping and account reconciliation, may often require a user to record information concerning each shipment by each shipping vendor, receive an invoice from each shipping vendor, review each invoice, compare each invoice entry against shipment records, and find matches. A user may further be asked to allocate shipping costs from multiple shipping vendors to the appropriate accounts, departments, clients, etc. In addition, a user may need to input shipping label and/or invoice information into a cost recovery or other accounting system. Managing information in such a manner may be inefficient, time-consuming, and prone to error.

Processing inbound shipments may also be time-consuming and unduly repetitive, because much of the shipping information may need to be gathered and/or entered manually into data records. For example, an incoming shipment may need to be processed individually, which may require reviewing the recipient information, determining whether such recipient information is current and/or valid, identifying a location of the recipient in the building, complex, suite, or the like, and maintaining and updating sender information into data records. Some situations may further require recording information about the sender of the package to allow for correlation among, for example, information from previous shipments, information regarding current shipments, and data that may be available from advance data feeds from the shipping vendors.

There is, therefore, a need in the art for improved systems and methods for receiving inbound shipments.

SUMMARY OF THE INVENTION

Exemplary systems and methods of the present invention provide for receiving inbound shipments. Bar code information may be decoded, and various types of information can be identified from the decoded bar code information. Such information may include, for example, recipient name, recipient address, a sender account number with the shipping vendor, etc. A database is searched based on such identified information. If found in the database, a report may be generated concerning the shipment. Such report may be stored and retrieved for reference when a future shipment with similar information is received. Some embodiments of the present invention further provide for the ability to correlate tracking numbers with, for example, advanced data feeds from the internet, publicly available data (i.e., Internet searches for tracking numbers), and data generated from the outbound shipping process (e.g., from the label server described in related U.S. patent application Ser. No. 12/122,658), and purchase order systems. Further embodiments of the present invention further allow for users from separate organizations to automatically receive and correlate such information.

Various other embodiments of the present invention include methods for receiving inbound shipments. Such methods may include decoding bar code information associated with an inbound shipment, identifying information concerning a recipient of the shipment from the decoded bar code information, searching a database for information associated with the identified recipient information, and generating a report concerning the identified recipient information and the associated information found in the database. Further embodiments may include associating the sender account number with sender information such that future shipments associated with the sender account number may also be automatically associated with the sender information and/or recipient information.

Some embodiments of the present invention include systems for receiving inbound shipments. Such systems may include a memory for storing various types of shipping information, an interface for displaying reports regarding such shipping information, and a processor for decoding bar code information, identifying shipping information, determine whether such shipping information is present in memory, and generating a report based on such shipping information.

Embodiments of the present invention also include computer-readable storage media having embodied thereon programs executable by a processor to perform methods for receiving inbound shipments.

DETAILED DESCRIPTION

The present invention includes systems and methods for receiving inbound shipments. Bar code information may be received and decoded. The decoded bar code information may include shipping information, such as recipient information, sender information, order numbers, parcel value, shipping vendor information, etc. A database is searched for the shipping information identified from the decoded bar code information. Reports may be generated based on the shipping information, as well as any associated information found in the database.

Figure 1:
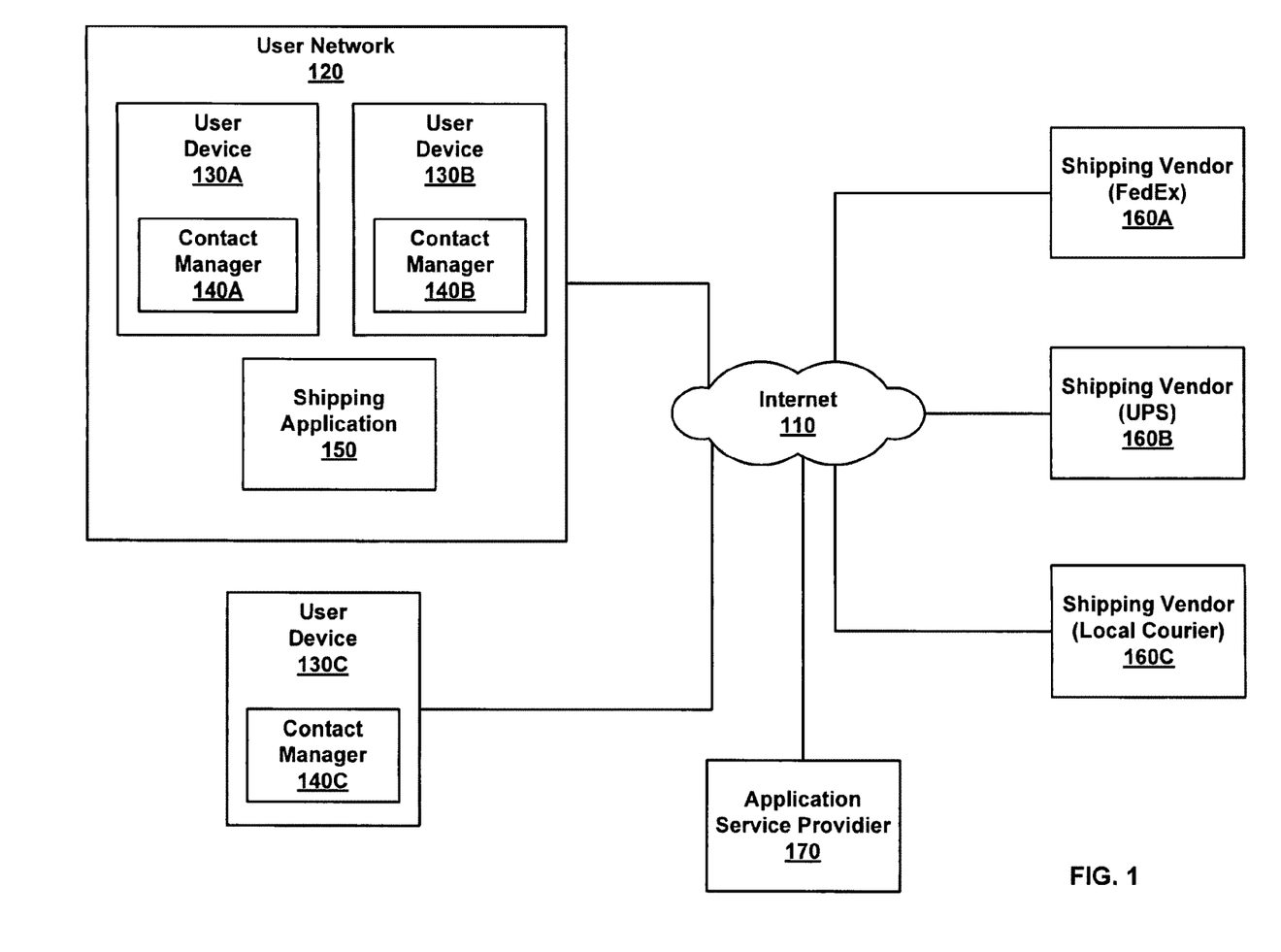
FIG. 1 illustrates an exemplary computer network in which a system for receiving inbound shipments may be used.

FIG. 1 illustrates an exemplary computer network in which a system for receiving inbound shipments may be used. Internet 110 allows for communication between user network 120 and various shipping vendors 160A-C. User network 120 is communicatively coupled to the Internet 110 and may include various user devices (e.g., user devices 130A and 130B), an accounting system 140, and a shipping application 150. The various shipping vendors 160A-C are also communicatively couple to the Internet and may receive and transmit information to user network 120. In some embodiments, the system 100 may include a user device 130C communicatively coupled over the Internet 110 to an application service provider (ASP) 170, which provides user device 130C with the same services as shipping application 150.

User network 120 may be a local, proprietary network (e.g., intranet), a part of a larger wide-area network, and/or a hosted network. For example, user network 120 may be a local area network (LAN) in an office. Alternatively, a user network 120 for a large organization may span multiple offices in multiple buildings in multiple locations.

User network 120 may include one or more user devices (e.g., user devices 130A and 130B). Such user devices may include various computing devices, workstations, etc. that allow users to communicate with various other components of system 100. For example, using user device 130A, a user may designate specifications for shipping labels, view label information, view invoice information, view reports, request reports based on various user specifications, etc. Each user device (e.g., user device 130A) may include a contacts manager (e.g., contacts manager 140A) configured to store information regarding various contacts, including addresses, telephone numbers, e-mail addresses, and the like. Contacts manager 140A may further correlate contact information with various shipping specifications (e.g., a particular address, such as a contact's office, may be associated with a particular courier service or particular delivery hours). Examples of contacts managers may include Microsoft Outlook®, Lotus Notes®, etc.

Accounting system 140 may be any system that an enterprise uses to manage various financial transactions. For example, accounting system 140 may be used to handle accounts receivable, accounts payable, invoice processing, cost allocation, cost recovery, billing, etc. To perform such transactions, accounting system 140 may require various types of input from one or more sources; for example, some information may be entered or selected by a user, from a shipping vendor's invoice, from internally generated intra-office transactions, from cost information entered manually (e.g., United States Postal Service rates), etc.

A shipping information application 150 may also be installed in user network 120 or in the application service provider (ASP) model by application service provider device 170. Described in further detail with respect to FIG. 2, shipping information application 150 allows for user devices in user network 120 to transfer shipping information. For example, shipping information may be transferred as part of various shipping-related transactions and communications with various shipping vendors. Shipping information application 150 may be any collection of routines that perform various system-level functions and may be dynamically loaded and unloaded by hardware and device drivers as required. The modular software components described herein may also be incorporated as part of a larger software platform or integrated as part of an application specific component. In various embodiments, shipping information application 150 may be installed on a server in user network 120, on one or more user devices in user network 120, on an application service provider 170, or in any other appropriate fashion.

Shipping application 150 may further allow for communications and transactions that are specific to each shipping vendor. The shipping vendors 160A-C may include, for example, FedEx®, United Parcel Service (UPS®), and/or DHL®, as well as various local couriers, international and intra-office transactions.

Figure 2:
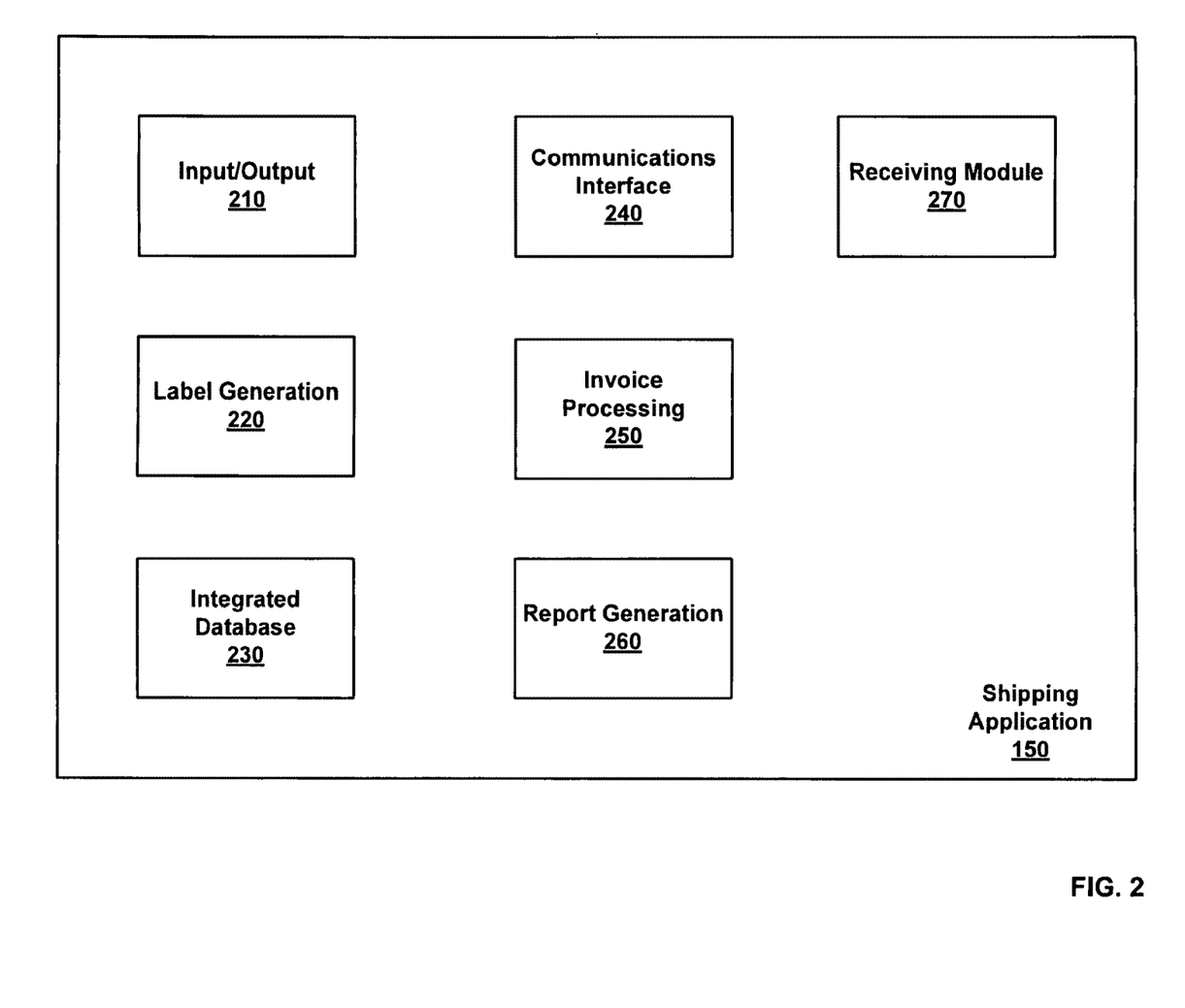
FIG. 2 is a block diagram of an exemplary system for receiving inbound shipments.

FIG. 2 is a block diagram of an exemplary system for receiving inbound shipments. As illustrated, shipping application 150 includes input/output 210, label generation module 220, integrated database 230, communications interface 240, invoice processing module 250, report generation module 260, and receiving module 270.

Input/output 210 is configured to allow for communication between shipping application 150 and various other elements of user network 120. Input/output 210 may be configured to communicate using a network port, a wireless connector, an Ethernet or TCP/IP standard, etc. Information communicated through input/output 210 may include, for example, various shipping specifications for shipping labels, invoice information from various shipping vendors, etc.

Label generation module 220 generates labels for shipment. Information in the labels may be provided by a user, a contacts manager or contacts database on a user device, shipping vendors 160A-C, etc. For example, a user may enter recipient information using user device 130A, or the user may designate a contact and a contact address listed in a contacts database (e.g., Microsoft Outlook®, Lotus Notes®, etc.) as the recipient of a shipment. Label generation module 220 then generates shipping labels for the designated contact. Various types of label information may be gathered during label generation, including user information, recipient information, tracking numbers, billing information, client number, department codes, etc. In some embodiments, label information may further include various shipping specifications, pricing information, etc.

Integrated database 230 is configured to store various types of shipping-related information. The information stored in integrated database 230 may include various types of shipping information. Such shipping information may include label information, invoice information, billing information, user information, incoming shipment information, etc., concerning multiple shipping vendors and/or various international office shipments. Storing the various types of shipping information from the multiple shipping vendors and international services in integrated database 230 allows for efficient retrieval and analysis of such information. For example, a user may use multiple shipping vendors in carrying out business for a particular account.

In some embodiments, information stored in integrated database 230 may be transmitted to an accounting system (e.g., accounting system 140 of user network 120) to be used in cost allocation, cost recovery, billing, etc. Alternatively, integrated database 230 may provide information for one or more feeds, exports, or reports (e.g., generated by report generator 250, described below) for the accounting system (e.g., accounting system 140). Integrated database 230 may also receive information via such feeds. In some embodiments, integrated database 230 may also serve as a contacts database or be linked to a contacts database associated with an individual or organization.

Communications interface 240 allows for communication with various shipping vendors. In some cases, receiving incoming package information from a particular vendor may involve using a particular interface specific to that vendor, and communications interface 240 may include various vendor-specific application programming interfaces (APIs). For example, receiving an invoice from FedEx® may involve using an API specific to FedEx®, receiving an invoice from UPS® may involve using an API specific to UPS®, and so forth. In some embodiments, communications interface 240 may be used to receive data feeds, including feeds with electronic data interchange (EDI), extensible markup language (XML) files or the like associated with incoming package information from a particular shipping vendor. Such files conform to a set of standards for electronic transmission between businesses. Such EDI files may be received from a shipping vendor and stored in integrated database 230. In some embodiments, data feeds from shipping vendors may be encrypted. For example, a data feed concerning a particular shipment may be encrypted using a tracking number of the shipment as a key.

Invoice processing module 250 is configured to receive and process invoice information from shipping invoices associated with multiple shipping vendors. In some embodiments, invoice processing module 250 receives EDI files from various shipping vendors and extracts various invoice information from the EDI files. Invoice processing module 250 may also provide the invoice information to integrated database 230 for storage and may also provide advance data regarding incoming packages.

Report generation module 260 provides one or more reports concerning shipping information. Reports may further be based on various report specifications. The shipping information is provided by integrated database 230, and report specifications may be provided by a user, a system administrator, etc. For example, a user may request a report concerning various inbound shipments, such as internal delivery locations, recipients, delivery time, etc. In some embodiments, the reports generated by report generation module 260 may simply be displayed via an interface (not shown) to a user. Such reports may further be provided in such a way as to allow the user to add information, remove information, or otherwise edit information in the reports.

Receiving module 270 processes information concerning received inbound shipments. One source of such information is a reading or scan of a bar code associated with a received inbound shipment. Two-dimensional bar codes, in particular, may encode a lot of information which may include, for example, recipient name, recipient address, sender account number, and the like. Such information may be encoded differently based on the person or entity doing the encoding. For example, a particular shipping vendor may follow a certain set of standards for encoding information in a bar code.

Upon receiving shipping information such as that encoded in a bar code, receiving module 270 may further identify what information is included in the encoded information. Receiving module 270 may then request or initiate a search of database 230 for the identified information. The results of such a search may then be provided to report generation module 260 for inclusion in various reports. In some embodiments, the generated report may include a display of the identified information, along with any associated information. For example, the receiving module 270 may identify a recipient name from the decode bar code information. Receiving module 270 may then request a search of database 230 based on the recipient name. The database 230 may then provide a recipient address, e-mail address, phone number, information regarding previous shipments to the recipient, etc. Receiving module 270 may then provide such information provided by the database 230 to report generation module 260. The recipient information may be displayed along with other information associated with such recipient information in the database 230. The display may be based on report specifications as indicated by a user, system administrator, etc.

In some instances, a sender account number (e.g., associated with a shipping vendor) may be identified from the decoded information, and a search of database 230 for such sender account number may be conducted. If the sender account number is not found, receiving module 270 may request that a user to input sender information associated with the sender account number. Such sender information may be provided to database 230 for storage and retrieval based on searches concerning future inbound shipments.

Other embodiments may include scanning the tracking number on the package received and then searching the database to see if the tracking number correlates to advance data about incoming shipments (e.g., from data feeds sent by a shipping vendor, regarding an intra/inter-office shipment generated via a PSIShip™ system, or some other transaction generated internally such as a purchase order number). If the database search finds a match, then the internal delivery data including recipient, sender, etc. may be automatically transferred to the database, and a report (e.g., label) can be printed.

Various embodiments of the present invention provide for receiving module 270 to process the same shipment multiple times. For example, a shipment containing a set of documents may be circulated throughout an organization. Receiving module 270 provides for receiving and tracking information regarding the circulating shipment. In some embodiments, receiving module 270 may further be configured to receive encrypted data feeds from various shipping vendors concerning shipments. A data feed concerning a particular shipment may be encrypted, for example, using the tracking number as a key for encryption/decryption.

Figure 3:
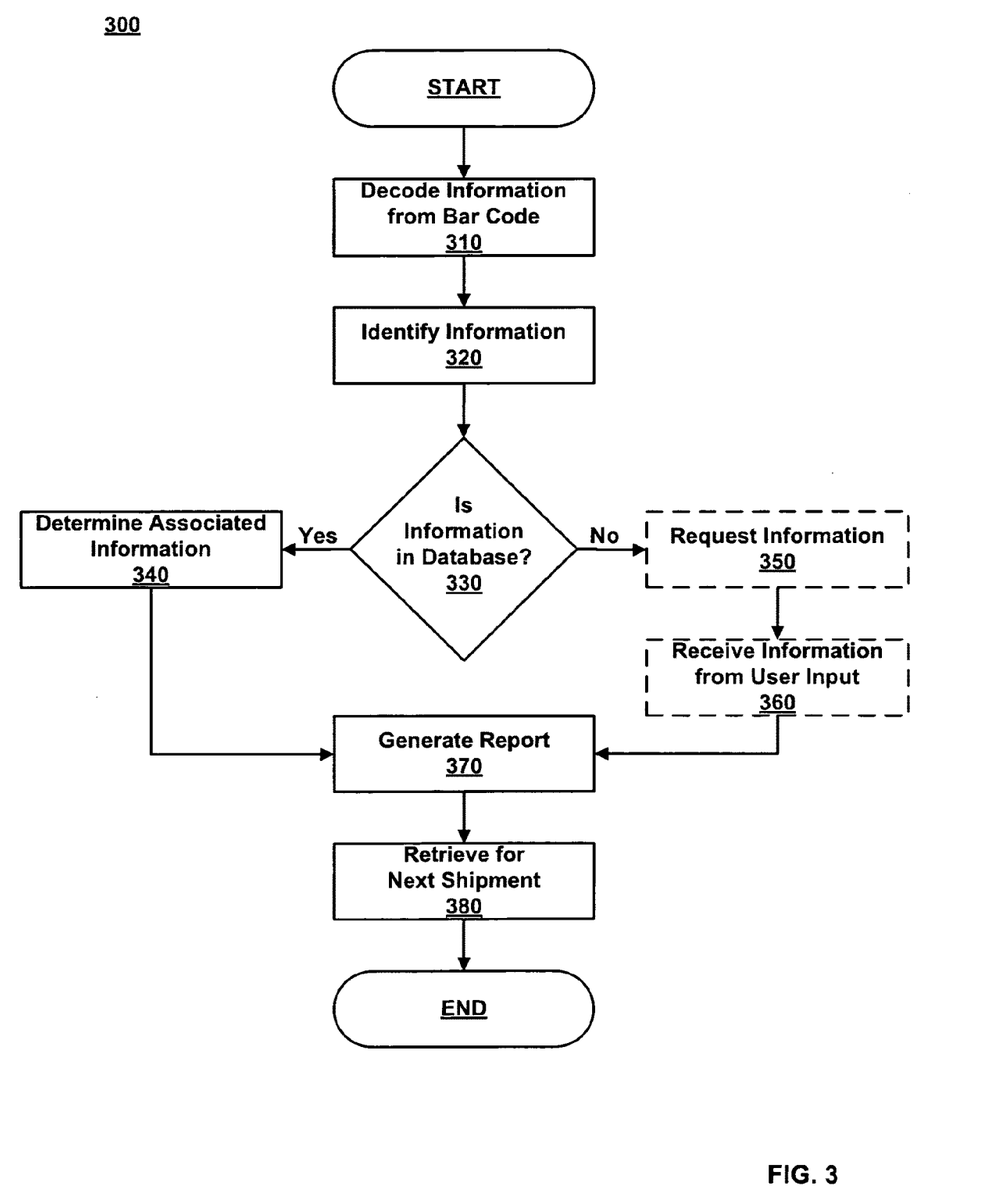
FIG. 3 is a flowchart depicting an exemplary method for receiving inbound shipments.

FIG. 3 is a flowchart depicting an exemplary method for receiving inbound shipments. In this method, bar code information is decoded, shipping information is identified, a database is searched for the identified shipping in information, and a report is generated based on information associated or related to the identified and searched shipping information. If there is no related information in the database, a user may be queried and asked to input such related information.

In step 310, bar code information is decoded. Such bar code information may be received from a scanner or reader. The keys for coding and decoding may be specific to a shipping vendor. Notwithstanding the source, such keys allow for information to be decoded from a reading or scan of a one-dimensional or two-dimensional bar code. Some embodiments may further include using radio-frequency identification (RFID) for encoding/decoding information.

In step 320, shipping information may be identified from the decoded bar code information. As discussed above, various types of shipping information may be included in the decoded bar code information. Recipient name and address, for example, may be identified.

In step 330, a database (e.g., database 230) is searched for the identified shipping information. For example, the identified shipping information may be a recipient name. Database 230 can be searched to see whether the recipient name is present. In some embodiments, some data in database 230 may be provided by data feeds from shipping vendors, senders using a similar system, inter/intra-office shipping processes, and the like. For example, a recipient organization may receive an advance data feed from a shipping vendor concerning multiple packages being sent to the recipient organization. Such data feeds may be encoded, for example, using a tracking number. The recipient organization, being in possession of the tracking numbers for expected packages, may decode such data feed and correlate to information from the received package.

In step 340, the identified shipping information has been found in the database (e.g., database 230) and it is determined whether there is any associated information. For example, if the recipient name is found in the database, it is determined whether other recipient information (e.g., recipient address, recipient phone number, recipient shipping history) is also present in the database. If the recipient or any of the recipient information such as phone number, delivery location, etc. is not found in the database, such information may be entered and automatically retrieved the next time the recipient receives a package.

In step 350, the identified shipping information is not found in the database and is requested. For example, the identified shipping information may be a sender account number for a shipping vendor. If the shipment is the first one from a particular sender, the sender account number may not be found in database 230. Other shipping information regarding the sender may be missing from database 230 as well. Such shipping information may be requested from a user. A request for more information may appear as a notification via email, pop-up window, icon, or the like. Alternatively, there may be simply an indication that information is missing and the user may input the information if he/she desires.

In step 360, further shipping information is received via user input. Using the example discussed with respect to step 350, the user may input the missing sender information. In some embodiments, the user may simply enter the missing information into a provided form, may upload the missing information, or the like. Some embodiments allow for the user to upload photos of the shipment as it appeared when it was received. Such information may be provided to memory (e.g., database 230) for storage.

In step 370, a report is generated based on the shipping information associated with the received shipment. In some embodiments, the report may simply be a display including the decoded bar code information, along with any information found to be associated. Reports may be customized by a user, for example, to include specified fields of information for various purposes. Some reports may be used as input in accounting systems (e.g., accounting system 140). For example, some users may bill clients for shipments sent on the clients' behalf. A user may generate a report concerning shipments associated with a particular client, and the report may be used as input in calculating a bill for that client. Further, some reports may be used to track the shipment as it circulates to multiple recipients.

In step 380, the information in the report may be stored and retrieved for a next received shipment. For example, a next shipment may be received that is associated with the same sender account number. Information concerning the sender may not be included in the decoded bar code information associated with that next shipment. Because such information has been previously requested and entered in steps 350 and 360, however, such information will automatically be found and reported.

Figure 4:
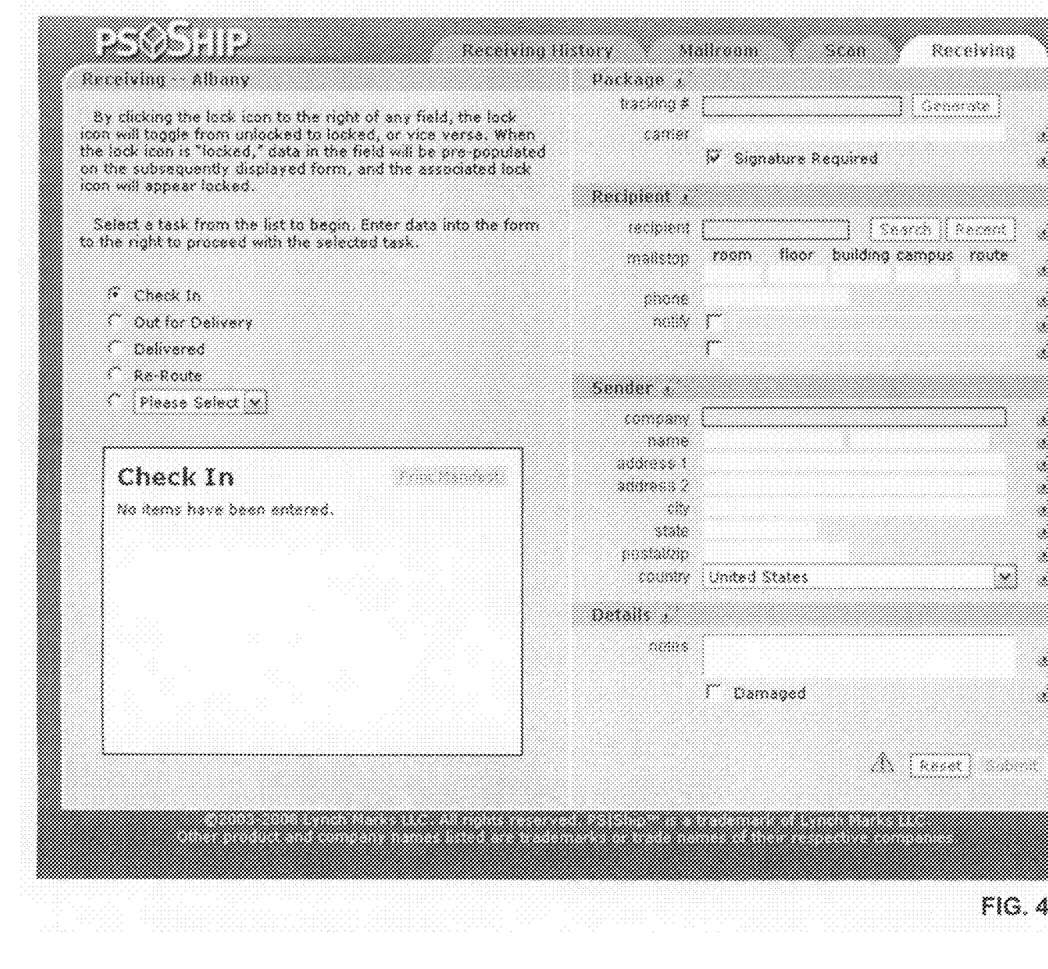
FIG. 4 is an exemplary screenshot of an interface used in receiving inbound shipments in an embodiment of the present invention.

FIG. 4 is an exemplary screenshot of an interface used in receiving inbound shipments in an embodiment of the present invention. The display includes various fields of shipping information. In some embodiments, when the bar code information is decoded, some of the fields may be automatically populated with information identified as being associated with such a field. For example, a recipient name may be decoded and identified and automatically appear in the recipient name field. If there is information associated with the recipient name in the database, such information may also be provided from the database to automatically populate the appropriate fields. For example, information concerning a recipient's room number, floor, building, campus, route, phone number, etc., may appear. If any field remains blank, the user can enter input regarding such a field.

It is noteworthy that any hardware platform suitable for performing the processing described herein is suitable for use with the invention. The terms "computer-readable medium" and "computer-readable media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for managing inbound shipments, further comprising:
   receiving an electronic data feed from a shipping vendor concerning at least one shipment, the data feed being encrypted based on a tracking number of the at least one shipment; and
   executing instructions stored in memory, wherein execution of the instructions by a processor:
      decodes the data feed using the tracking number as maintained in a table of tracking numbers, the table of tracking numbers stored in memory;
      identifies shipping information from the decoded data feed; and
      matches the identified shipping information from the decoded data feed to identified shipping information from decoded bar code information associated with a received shipment.

2. The method of claim 1, further comprising:
   decoding the bar code information associated with the received shipment;
   identifying shipping information from the decoded bar code information;
   searching a database for information associated with the identified shipping information from the decoded bar code information; and
   generating a report concerning the identified shipping information from the decoded bar code information and associated information found in the database.

3. The method of claim 1, wherein the shipping information from the decoded bar code information comprises information concerning a recipient of the inbound shipment and wherein the associated information in the database includes contact information for the recipient.

4. The method of claim 1, wherein the shipping information from the decoded bar code information comprises information concerning a sender account number for a shipping vendor and wherein the associated information in the database includes contact information for the sender.

5. The method of claim 1, wherein generating a report further comprises generating a display of the report.

6. The method of claim 1, further comprising:
   receiving shipping information not included in the decoded bar code information from user input; and
   storing the shipping information received from the user input, wherein a next shipment associated with at least some of the identified shipping information is automatically associated with the shipping information received from the user input.

7. The method of claim 6, further comprising:
   determining that shipping information not included in the decoded bar code is not present in the database; and
   requesting user input concerning the shipping information not included in the decoded bar code information and determined not to be present in the database.

8. The method of claim 1, further comprising:
   receiving a data feed from a shipping vendor including shipping information concerning one or more packages; and
   storing the data feed shipping information in the database, wherein searching the database for information associated with the identified shipping information from the decoded bar code information includes searching the data feed shipping information.

9. The method of claim 1, further comprising:
   determining an email address associated with a recipient of the shipment;
   generating an email notification concerning the shipment; and
   sending the generated email notification to the determined recipient email address, wherein the recipient can access and view information associated with the shipment.

10. The method of claim 1, further comprising:
    receiving an indication from a user concerning a new destination for the shipment;
    storing the indication in the database; and
    retrieving the indication during a next search for the identified shipping information from the decoded bar code information.

11. The method of claim 1, further comprising updating the table after a predetermined period of time.

12. A system for managing inbound shipments, the system comprising:
    a memory configured to maintain a table of tracking numbers associated with shipments;
    an interface configured to receive an electronic data feed from a shipping vendor concerning at least one shipment, the data feed being encrypted based on a tracking number of the at least one shipment; and
    a processor is further configured to:
       decode the data feed using the tracking number as maintained in the table of tracking numbers in memory;
       identify shipping information from the decoded data feed; and
       match the identified shipping information from the decoded data feed to identified shipping information from decoded bar code information associated with a received shipment.

13. The system of claim 12, wherein:
    the memory is further configured to store shipping information;
    the processor is further configured to:
       decode the bar code information associated with the received shipment,
       identify shipping information from the decoded bar code information,
       search memory for information associated with the identified shipping information from the decoded bar code information, and
       generate a report concerning the identified shipping information from the decoded bar code information and associated information found in memory; and
    the interface is further configured to display the generated report concerning the identified shipping information from the decoded bar code information and the associated information found in memory.

14. The system of claim 13, further comprising a scanner configured to read a bar code associated with the shipment.

15. The system of claim 13, wherein the bar code is two-dimensional and the scanner is further configured to read two-dimensional bar codes.

16. The system of claim 13, wherein the interface further comprises an input device configured to receive the sender information from a user.

17. The system of claim 13, wherein:
    the interface is further configured to receive shipping information not included in the decoded bar code information from user input, the memory is further configured to store the shipping information received from the user input, and a next shipment associated with at least some of the identified shipping information is further associated with the shipping information received from the user input.

18. The system of claim 13, wherein the processor is further configured to:

determine that shipping information not included in the decoded bar code is not present in memory and request user input concerning the shipping information not included in the decoded bar code information and determined not to be present in the database.

19. The system of claim 13, wherein:

the interface is further configured to receive an indication from a user concerning a new destination for the shipment, the memory is further configured to store the indication; and the processor is further configured to retrieve the indication from memory during a next search for the identified shipping information from the decoded bar code information.

20. A non-transitory computer-readable storage medium, having embodied thereon a program, the program being executable by a processor to perform a method for receiving inbound shipments, the method comprising:

receiving an electronic data feed from a shipping vendor concerning at least one shipment, the data feed being encrypted based on a tracking number of the at least one shipment;

decoding the data feed using the tracking number as maintained in a table of tracking numbers;

identifying shipping information from the decoded data feed; and matching the identified shipping information from the decoded data feed to identified shipping information from decoded bar code information associated with a received shipment.

* * * * *